Patented Oct. 28, 1941

2,261,097

UNITED STATES PATENT OFFICE 2,261,097

WATER REPELLENT AND PROCESS OF MAKING SAME

John B. Rust, West Orange, N. J., assignor to Ellis-Foster Company, a corporation of New Jersey No Drawing. Application July 19, 1939, Serial No. 285,456

7 Claims. (Cl. 260—295)

This invention relates to the production of new compounds suitable for rendering textile fibers water repelling and to the process of making same. The novel compounds have the general formula RCOO—CHR$^1$—N(tert.)—X, where R stands for an alkyl radical containing not less than 10 carbon atoms, R$^1$ is hydrogen, an alkyl, aryl, or alkaryl radical, X represents halogen or an organic acid anion radical and the group denoted by N(tert.) is a tertiary amine such as pyridine, quinoline, triethanolamine or trimethylamine.

An object of the invention is to provide readily water dispersible materials which when applied to textile fibers and thereafter decomposed on the fibers will render them distinctly water repellent.

I have found that these materials may be readily synthesized from aldehydes, the acid chlorides of the higher fatty acids such as stearic, palmitic and lauric acids, and a tertiary amine. The acid chlorides may be formed in any convenient manner such as treatment of the acid or alkali metal soap with phosphorus trichloride, phosphorus pentachloride, or thionyl chloride. I have further found that if thionyl chloride is employed I may coreact the fatty acid, aldehyde such as formaldehyde in the form of its water-free polymers and thionyl chloride to obtain the chloralkyl ester of the acid. When this is treated with pyridine a material of the general formula given above is secured. In the event that the acid chloride is available or initially prepared, the quaternary ammonium compounds may be secured by reacting together the amine, acid chloride and aldehyde until water-soluble materials are obtained. Formaldehyde is preferred but other aldehydes than formaldehyde can be employed such as acetaldehyde, propionaldehyde, butyraldehyde, and benzaldehyde. A further modification is that in some cases it has been found possible to use mixed anhydrides such as stearoacetic anhydride, lauropropionic anhydride and so forth in place of the acid chloride in the above reaction. The latter products correspond to the general formula wherein X is the radical of a weak water-soluble organic acid.

The reaction products dissolve in water to form cloudy, strongly foaming solutions. One per cent solutions in water are usually satisfactory for producing a permanent water repelling effect on textile fibers although greater or less concentrations may be employed if found desirable. After immersing the textile fiber or fabric in the solution the material is passed between pressure rolls to squeeze out the excess solution and is then dried at room temperature or at slightly above room temperature. When dry, the impregnated material is baked in an oven at an elevated temperature.

The following examples are given to illustrate the process of the present invention, all proportions being in parts by weight.

*Example 1.*—90 parts of stearyl chloride were heated with 12 parts of paraformaldehyde on a steam bath at 90° C. for 4 hours. In this time the formaldehyde slowly dissolved, reacting with the stearyl chloride to produce a substantially odorless, low melting waxy chloromethyl stearate. 33.3 parts of chloromethyl stearate were treated with 7.9 parts of pyridine and warmed for several hours at 45° C. On allowing the material to stand at room temperature in tightly stoppered bottles for several weeks, the odor of pyridine disappeared and the stearoyl-oxymethyl pyridinium chloride which resulted was readily water dispersible.

*Example 2.*—32.7 parts of lauryl chloride were mixed with 4.5 parts of paraformaldehyde and 11.8 parts of pyridine. The mixture was heated on a steam bath at 90° C. until the lauryloxymethyl pyridinium chloride was readily water dispersible. This reaction occurred in from 3 to 4 hours.

*Example 3.*—45 parts of oleyl chloride were mixed with 12 parts of pyridine and 4.6 parts of paraformaldehyde. The mixture was heated on a steam bath at 90° C. for 4 hours, resulting in a readily water dispersible oleyloxymethyl pyridinium chloride.

*Example 4.*—30.2 parts of stearyl chloride, 4.4 parts of paraldehyde and 7.9 parts of pyridine were heated on a steam bath at 90–100° C. for 6 hours. In this time α-stearoyloxyethyl pyridinium chloride was formed which was readily soluble in water to form strongly foaming solutions.

*Example 5.*—51.2 parts of palmitic acid, 6 parts of paraformaldehyde and 23.6 parts of thionyl chloride were heated together slowly up to 90° C. on a steam bath. To the chloromethyl palmitate which had been formed, 15.8 parts of pyridine were added, when evolution of sulphur dioxide and hydrogen chloride had ceased. The solution which resulted was bottled and tightly stoppered, then heated at 60° C. for 48 hours. A slow reaction with the pyridine occurred and the originally liquid material slowly solidified.

In order to secure the lighest colored quaternary ammonium compounds of this invention it is desirable to work at as low temperatures as possible. It has been found that in the first place light colored chloromethyl esters may be produced by the simultaneous reaction of thionyl chloride with an acid and formaldehyde or its polymers. In producing the quaternary ammonium derivative, the least darkening is caused by reacting the α-chloro ester with a tertiary amine somewhat below 100° C. and in the case of pyridine preferably within the range of 50–70° C.

*Example 6.*—85.2 parts of stearic acid, 9 parts of paraformaldehyde and 35.4 parts of thionyl chloride were heated on a steam bath at 90° C. for 2½ hours in which time all evolution of fumes ceased. The chloromethyl stearate was cooled to room temperature and 23.7 parts of pyridine added. The solution was heated at 60° C. for 48 hours, resulting in a pure white, hard waxy stearoyloxymethyl pyridinium chloride. The stearoyloxymethyl pyridinium chloride was recrystallized twice from a mixture of ethyl acetate and ethyl alcohol. The crystals were found to have a melting point of 93–94° C.

Example 7.—85.2 parts of stearic acid, 18 parts of acetic acid, 9 parts of paraformaldehyde and 35.4 parts of thionyl chloride were heated together at 90° C. under a reflux condenser for 4 hours until fumes were no longer given off. The pale yellow liquid was cooled to room temperature, mixed with 23.7 parts of pyridine and placed in a closed container. It was then heated at 60–70° C. for 72 hours, resulting in a white waxy stearoyloxymethyl pyridinium acetate.

Example 8.—11.1 parts of chloromethyl stearate (formed as in Example 1) were warmed at 40° C. with 5 parts of triethanolamine for about 20 minutes. A pale, hard, waxy stearoyloxymethyl triethanol ammonium chloride was secured. This material was very readily dispersible in water.

The materials described in the foregoing examples are all readily dispersible in water and as water solutions may be used to impregnate textile materials. The treated textiles (e. g., cotton, linen, rayon, acetate, wool, and silk) are dried at substantially below 100° C., preferably below about 60° C. Then the materials are heated at above about 100° C. in order to decompose the quaternary ammonium salts in the fibers. The following is a tabulation of the materials in the above examples and the effect imparted to textile cotton by them:

The above examples are not limiting to the scope of this invention in any way, since numerous modifications may be made in the long chain fatty acid, aldehyde, tertiary amine and halogen or organic salt-forming acid.

What I claim is:
1. Stearoyloxymethyl pyridinium chloride.
2. Alpha-stearoyloxyethyl pyridinium chloride.
3. Stearoxymethyl pyridinium acetate.
4. A compound of the general formula RCOO—CHR$^1$—N(tert.)—X, wherein R is an alkyl radical containing not less than 10 carbon atoms, R$^1$ is selected from the group consisting of hydrogen, alkyl, aryl and aralkyl groups, N(tert.) is a tertiary amine and X is selected from the group consisting of halogens and anion radicals of water-soluble carboxylic acids, said compound being capable of rendering cellulosic textile materials water-repellent.
5. The process of making a compound of the general formula RCOO—CHR$^1$—N(tert.)—X, wherein R is an alkyl radical of not less than 10 carbon atoms, R$^1$ is selected from the group consisting of hydrogen, alkyl, aryl and aralkyl groups, N(tert.) represents a tertiary amine and X is selected from the group consisting of halogens and organic acid anion radicals, said compound being capable of rendering fabrics water-repellent, which comprises reacting a compound RCOX with an aldehyde R$^1$CHO and further treating the intermediate with a tertiary amine.
6. The process of making a compound of the formula RCOO—CHR$^1$—N(tert.)—Cl, wherein R is an alkyl radical of not less than 10 carbon atoms, R$^1$ is selected from the group consisting of hydrogen, alkyl, aryl and aralkyl groups, and N(tert.) represents a tertiary amine, said compound being capable of rendering fabrics water-repellent, which comprises reacting thionyl chlo-

| Example | Material | Percent solution | Percent NaAc.3H$_2$O | Dried at— | Baked at— | Remarks |
|---|---|---|---|---|---|---|
| 1 | Stearoyloxymethyl pyridinium chloride. | 2 | 0.66 | Room temperature. | 120° C. 5 min. | Excellent water repellency. No tendering of cloth. |
| 2 | Lauryloxymethyl pyridinium chloride. | 2 | 0.66 | do | 120° C. 10 min. | Do. |
| 3 | Oleyloxymethyl pyridinium chloride. | 2 | 0.66 | do | do | Do. |
| 4 | α-Stearoyloxyethyl pyridinium chloride. | 2 | 0.66 | do | do | Do. |
| 5 | Palmityloxymethyl pyridinium chloride. | 1 | 0.33 | do | 140° C. 5 min. | Boiled 1 hr. in 0.25% soap solution. Excellent water repellency. |
| 6 | Stearoyloxymethyl pyridinium chloride. | 2 | 0.66 | do | 120° C. 10 min. | Excellent water repellency. No tendering of cloth. |
| 7 | Stearoyloxymethyl pyridinium acetate. | 2 | None | do | 140° C. 10 min. | Do. |
| 8 | Stearoyloxymethyl triethanol ammonium chloride. | 2 | None | do | 120° C. 5 min. | Do. |

In the above table sodium acetate was employed as the neutralizing agent in some cases; however, other salts of weak acids may also be used. In this way the textiles are not tendered on baking and on washing possess a soft feel not present in the untreated cloth. When the stronger tertiary amines such as trimethylamine, triethanolamine and the like are employed no neutralizing agent need be used. On the other hand, by the use of weak organic acids such as acetic, formic, succinic, phthalic and the like to form the mixed ester of the hypothetical methylene glycol and subsequent treatment of the mixed ester with a tertiary amine to form the quaternary ammonium salt, no further neutralizing agent is found to be necessary.

ride with an acid RCOOH and an aldehyde R$^1$CHO, and treating the intermediate with a tertiary amine.
7. The process of making a compound of the formula RCOO—CHR$^1$—N(tert.)—OCOR$^{11}$, wherein R is an alkyl radical of not less than 10 carbon atoms, R$^1$ is selected from the group consisting of hydrogen, alkyl, aryl and aralkyl groups, N(tert.) represents a tertiary amine and OCOR$^{11}$ is a radical of a weak water-soluble carboxylic acid, said compound being capable of rendering cloth water-repellent, which comprises reacting thionyl chloride with an acid RCOOH, an acid R$^{11}$COOH and an aldehyde R$^1$CHO, and treating the intermediate with a tertiary amine.

JOHN B. RUST.